United States Patent
Brown

(10) Patent No.: US 7,506,088 B2
(45) Date of Patent: *Mar. 17, 2009

(54) METHOD AND APPARATUS FOR SUPPORTING AND PRESENTING MULTIPLE SERIAL BUS NODES USING DISTINCT CONFIGURATION ROM IMAGES

(75) Inventor: Steven W. Brown, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/717,374

(22) Filed: Mar. 12, 2007

(65) Prior Publication Data

US 2007/0186013 A1 Aug. 9, 2007

Related U.S. Application Data

(63) Continuation of application No. 10/944,265, filed on Sep. 15, 2004, now Pat. No. 7,191,266, which is a continuation of application No. 09/432,869, filed on Nov. 2, 1999, now Pat. No. 6,813,663.

(51) Int. Cl.
*G06F 13/00* (2006.01)

(52) U.S. Cl. .............................. 710/104; 710/8; 710/10; 710/62

(58) Field of Classification Search ......... 710/104–106, 710/62, 63, 2, 305, 8, 10; 709/253, 301, 709/302, 220; 370/463; 714/1; 358/1.15; 711/102, 170; 713/1, 100
See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 5,014,262 A | 5/1991 | Harshavardhana | |
| 5,274,631 A | 12/1993 | Bhardwaj | |
| 5,321,812 A | 6/1994 | Benedict et al. | |
| 5,343,461 A | 8/1994 | Barton et al. | |
| 5,394,522 A * | 2/1995 | Sanchez-Frank et al. | .... 715/735 |
| 5,394,556 A | 2/1995 | Oprescu | |
| 5,406,643 A | 4/1995 | Burke et al. | |

(Continued)

FOREIGN PATENT DOCUMENTS

EP 1 805 706 3/2001

(Continued)

OTHER PUBLICATIONS

"Dynamic configuration management in reliable distributed real-time information systems" by Kim et al. (abstract only) Publication Date: Jan.-Feb. 1999.*

(Continued)

*Primary Examiner*—Glenn A Auve
(74) *Attorney, Agent, or Firm*—Gazdzinski & Associates, PC

(57) ABSTRACT

A method and apparatus for presenting a plurality of link devices as separate nodes within a single serial bus module by generating individual or a distinct configuration ROM image for each link device in the module. Each configuration ROM includes an entry for a distinct identifier representing the corresponding link device thereby creating a one to one mapping of link device to node via the distinct configuration ROM.

65 Claims, 5 Drawing Sheets

U.S. PATENT DOCUMENTS

| | | |
|---|---|---|
| 5,452,330 A | 9/1995 | Goldstein |
| 5,490,250 A | 2/1996 | Reschke et al. |
| 5,490,253 A | 2/1996 | Laha et al. |
| 5,493,568 A | 2/1996 | Sampat et al. |
| 5,495,481 A | 2/1996 | Duckwall |
| 5,524,254 A | 6/1996 | Morgan et al. |
| 5,539,390 A | 7/1996 | Nagano et al. |
| 5,541,670 A | 7/1996 | Hanai |
| 5,568,487 A | 10/1996 | Sitbon et al. |
| 5,568,641 A | 10/1996 | Nelson et al. |
| 5,583,922 A | 12/1996 | Davis et al. |
| 5,621,659 A | 4/1997 | Matsumoto et al. |
| 5,630,173 A | 5/1997 | Oprescu |
| 5,632,016 A | 5/1997 | Hoch et al. |
| 5,640,595 A | 6/1997 | Baugher et al. |
| 5,642,515 A | 6/1997 | Jones et al. |
| 5,654,657 A | 8/1997 | Pearce |
| 5,684,715 A | 11/1997 | Palmer |
| 5,701,476 A | 12/1997 | Fenger |
| 5,701,492 A | 12/1997 | Wadsworth et al. |
| 5,706,278 A | 1/1998 | Robillard et al. |
| 5,712,834 A | 1/1998 | Nagano et al. |
| 5,719,862 A | 2/1998 | Lee et al. |
| 5,754,765 A | 5/1998 | Danneels et al. |
| 5,764,930 A | 6/1998 | Staats |
| 5,784,648 A | 7/1998 | Duckwall |
| 5,802,048 A | 9/1998 | Duckwall |
| 5,802,057 A | 9/1998 | Duckwall et al. |
| 5,802,365 A | 9/1998 | Kathail et al. |
| 5,805,073 A | 9/1998 | Nagano et al. |
| 5,805,822 A | 9/1998 | Long et al. |
| 5,809,331 A | 9/1998 | Staats et al. |
| 5,819,115 A | 10/1998 | Hoese et al. |
| 5,826,027 A | 10/1998 | Pedersen et al. |
| 5,832,298 A | 11/1998 | Sanchez et al. |
| 5,835,761 A | 11/1998 | Ishii et al. |
| 5,854,152 A | 12/1998 | Anderson et al. |
| 5,867,730 A | 2/1999 | Leyda |
| 5,875,301 A | 2/1999 | Duckwall et al. |
| 5,923,663 A | 7/1999 | Bontemps et al. |
| 5,930,480 A | 7/1999 | Staats |
| 5,935,208 A | 8/1999 | Duckwall et al. |
| 5,938,764 A | 8/1999 | Klein |
| 5,940,600 A | 8/1999 | Staats et al. |
| 5,954,796 A | 9/1999 | McCarty et al. |
| 5,968,152 A | 10/1999 | Staats |
| 5,970,052 A | 10/1999 | Lo et al. |
| 5,987,605 A | 11/1999 | Hill et al. |
| 5,991,842 A | 11/1999 | Takayama |
| 6,006,275 A | 12/1999 | Picazo, Jr. et al. |
| 6,009,480 A | 12/1999 | Pleso |
| 6,012,084 A * | 1/2000 | Fielding et al. ............. 709/205 |
| 6,032,202 A | 2/2000 | Lea et al. |
| 6,032,261 A | 2/2000 | Hulyalkar |
| 6,038,234 A | 3/2000 | LaFollette et al. |
| 6,038,625 A | 3/2000 | Ogino et al. |
| 6,070,187 A | 5/2000 | Subramaniam et al. |
| 6,073,206 A | 6/2000 | Piwonka et al. |
| 6,091,726 A | 7/2000 | Crivellari et al. |
| 6,115,764 A | 9/2000 | Chisholm et al. |
| 6,122,248 A | 9/2000 | Murakoshi et al. |
| 6,131,129 A | 10/2000 | Ludtke et al. |
| 6,131,134 A | 10/2000 | Huang et al. |
| 6,131,163 A | 10/2000 | Wiegel |
| 6,133,938 A | 10/2000 | James |
| 6,138,163 A | 10/2000 | Nam et al. |
| 6,138,196 A | 10/2000 | Takayama et al. |
| 6,141,702 A | 10/2000 | Ludtke et al. |
| 6,141,767 A | 10/2000 | Hu et al. |
| 6,145,018 A | 11/2000 | LaFollette et al. |
| 6,157,972 A | 12/2000 | Newman et al. |
| 6,160,796 A | 12/2000 | Zou |
| 6,167,532 A | 12/2000 | Wisecup |
| 6,173,327 B1 | 1/2001 | De Borst et al. |
| 6,188,700 B1 | 2/2001 | Kato et al. |
| 6,192,189 B1 | 2/2001 | Fujinami et al. |
| 6,199,119 B1 | 3/2001 | Duckwall et al. |
| 6,202,210 B1 | 3/2001 | Ludtke |
| 6,212,171 B1 | 4/2001 | LaFollette et al. |
| 6,212,633 B1 | 4/2001 | Levy et al. |
| 6,219,697 B1 | 4/2001 | Lawande et al. |
| 6,226,680 B1 | 5/2001 | Boucher et al. |
| 6,233,615 B1 | 5/2001 | Van Loo |
| 6,233,624 B1 | 5/2001 | Hyder et al. |
| 6,243,778 B1 | 6/2001 | Fung et al. |
| 6,247,063 B1 | 6/2001 | Ichimi et al. |
| 6,247,083 B1 | 6/2001 | Hake et al. |
| 6,253,114 B1 | 6/2001 | Takihara |
| 6,253,255 B1 | 6/2001 | Hyder et al. |
| 6,256,059 B1 | 7/2001 | Fichtner |
| 6,260,063 B1 | 7/2001 | Ludtke et al. |
| 6,266,334 B1 | 7/2001 | Duckwall |
| 6,266,344 B1 | 7/2001 | Fujimori et al. |
| 6,266,701 B1 | 7/2001 | Sridhar et al. |
| 6,275,889 B1 | 8/2001 | Saito |
| 6,282,597 B1 | 8/2001 | Kawamura |
| 6,292,840 B1 | 9/2001 | Blomfield-Brown et al. |
| 6,295,479 B1 | 9/2001 | Shima et al. |
| 6,298,057 B1 | 10/2001 | Guy et al. |
| 6,308,222 B1 | 10/2001 | Krueger et al. |
| 6,311,228 B1 | 10/2001 | Ray |
| 6,314,461 B2 | 11/2001 | Duckwall et al. |
| 6,343,321 B2 | 1/2002 | Patki et al. |
| 6,345,315 B1 | 2/2002 | Mishra |
| 6,347,362 B1 | 2/2002 | Schoinas et al. |
| 6,353,868 B1 | 3/2002 | Takayama et al. |
| 6,356,558 B1 | 3/2002 | Hauck et al. |
| 6,363,085 B1 | 3/2002 | Samuels |
| 6,373,821 B2 | 4/2002 | Staats |
| 6,385,679 B1 | 5/2002 | Duckwall et al. |
| 6,405,247 B1 | 6/2002 | Lawande et al. |
| 6,411,628 B1 | 6/2002 | Hauck et al. |
| 6,418,150 B1 | 7/2002 | Staats |
| 6,425,019 B1 | 7/2002 | Tateyama et al. |
| 6,426,962 B1 | 7/2002 | Cabezas et al. |
| 6,442,630 B1 | 8/2002 | Takayama et al. |
| 6,445,711 B1 | 9/2002 | Scheel et al. |
| 6,446,116 B1 | 9/2002 | Burridge |
| 6,446,142 B1 | 9/2002 | Shima et al. |
| 6,452,975 B1 | 9/2002 | Hannah |
| 6,457,086 B1 | 9/2002 | Duckwall |
| 6,466,982 B1 | 10/2002 | Ruberg |
| 6,496,862 B1 | 12/2002 | Akatsu et al. |
| 6,502,144 B1 | 12/2002 | Accarie |
| 6,513,085 B1 | 1/2003 | Gugel et al. |
| 6,516,465 B1 | 2/2003 | Paskins |
| 6,519,657 B1 | 2/2003 | Stone et al. |
| 6,529,522 B1 | 3/2003 | Ito et al. |
| 6,574,588 B1 | 6/2003 | Shapiro et al. |
| 6,587,874 B1 * | 7/2003 | Golla et al. ................. 709/220 |
| 6,587,904 B1 | 7/2003 | Hauck et al. |
| 6,591,300 B1 | 7/2003 | Yurkovic |
| 6,606,320 B1 | 8/2003 | Nomura et al. |
| 6,618,750 B1 | 9/2003 | Staats |
| 6,618,764 B1 | 9/2003 | Shteyn |
| 6,618,785 B1 | 9/2003 | Whitby-Streves |
| 6,621,832 B2 | 9/2003 | Staats |
| 6,628,607 B1 | 9/2003 | Hauck et al. |
| 6,631,426 B1 | 10/2003 | Staats |
| 6,636,914 B1 | 10/2003 | Teener |
| 6,639,918 B1 | 10/2003 | Hauck et al. |
| 6,643,714 B1 | 11/2003 | Chrysanthakopoulos |
| 6,671,768 B1 | 12/2003 | Brown |
| 6,686,838 B1 | 2/2004 | Rezvani et al. |

| | | |
|---|---|---|
| 6,691,096 B1 | 2/2004 | Staats |
| 6,700,895 B1 | 3/2004 | Kroll |
| 6,711,574 B1 | 3/2004 | Todd et al. |
| 6,718,497 B1 | 4/2004 | Whitby-Strevens |
| 6,745,256 B2 | 6/2004 | Suzuki et al. |
| 6,813,663 B1 | 11/2004 | Brown |
| 7,032,014 B2* | 4/2006 | Thiyagarajan et al. ...... 709/220 |
| 7,191,266 B1* | 3/2007 | Brown ........................ 710/104 |
| 2001/0001151 A1 | 5/2001 | Duckwall et al. |
| 2001/0019561 A1 | 9/2001 | Staats |
| 2001/0024423 A1 | 9/2001 | Duckwall et al. |
| 2002/0057655 A1 | 5/2002 | Staats |
| 2002/0085581 A1 | 7/2002 | Hauck et al. |
| 2002/0101231 A1 | 8/2002 | Staats |
| 2002/0101885 A1 | 8/2002 | Pogrebinsky et al. |
| 2002/0103947 A1 | 8/2002 | Duckwall et al. |
| 2002/0172226 A1 | 11/2002 | Staats |
| 2002/0188780 A1 | 12/2002 | Duckwall |
| 2002/0188783 A1 | 12/2002 | Duckwall et al. |
| 2003/0037161 A1 | 2/2003 | Duckwall et al. |
| 2003/0055999 A1 | 3/2003 | Duckwall et al. |
| 2004/0037309 A1 | 2/2004 | Hauck et al. |
| 2005/0060391 A1* | 3/2005 | Kaminsky et al. ........... 709/220 |

FOREIGN PATENT DOCUMENTS

EP          1 805 706          10/2002

OTHER PUBLICATIONS

A large scale FPGA with 10k core cells with CMOS0.8 .mu.m 3-layered metal process by Muroga et al. (abstract only) Publication Date: May 12-15, 1991.

Bregni et al., Jitter Testing Technique and Results at VC-4 Desynchronizer Output of SDH Equipment, IEEE International Conference on Communications, vol. 3, pp. 1407-1410, May 12, 1994.

"Information technology-Microprocessor systems—Control and Status Registers (CSR) Architecture for microcomputer buses", ANSI/IEEE Standard 1212, The Institute of Electrical and Electronics Engineers, Inc. pp. 1-122, 1994 Edition.

Bregni et al., Jitter Testing Technique and Results at VC-4 Desynchronizer Output of SDH Equipment, IEEE Transactions on Instrumentation and Measurement, vol. 44, Issue 3, pp. 675-678, Jun. 1995.

"IEEE Standard for a High Performance Serial Bus", IEEE Standard 1394-1995, Institute of Electrical and Electronics Engineers, Inc., pp. 1-384, approved Jul. 22, 1996.

Shiwen et al., Parallel Positive Justification in SDH C.sub.—4 Mapping, IEEE International Conference on Communications, vol. 3, pp. 1577-1581, Jun. 12, 1997.

"AV/C Digital Interface Command Set General Specification Rev 3.0", 1394 Trade Association, pp. 4-5, 20-34, Apr. 15, 1998.

"Enhancements to the AV/C General Specification 3.0 Version 1.0FCI", 1394 Trade Association, pp. 4, 6-17, Nov. 5, 1998.

"Information Technology-Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronic Engineers, Inc., pp. 1-187, Jun. 30, 1999.

"IEEE Standard for a High Performance Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"IEEE Standard for a High Performance Serial Bus-Amendment 2", Institute of Electrical and Electronics Engineers, Inc., pp. 1-369, 2002, no month.

* cited by examiner

METHOD AND APPARATUS FOR SUPPORTING AND PRESENTING MULTIPLE SERIAL BUS NODES USING DISTINCT CONFIGURATION ROM IMAGES

CROSS REFERENCE TO RELATED APPLICATION

This application is a continuation of and claims priority to co-owned U.S. patent application Ser. No. 10/944,265, now U.S. Pat. No. 7,191,266, of the same title filed Sep. 15, 2004, which is a continuation of co-owned U.S. patent application Ser. No. 09/432,869, now U.S. Pat. No. 6,813,663, filed Nov. 2, 1999, each of which are herein incorporated by reference in its entirety.

BACKGROUND OF THE INVENTION

1. Field of the Invention

This invention pertains generally to configuration ROM implementations for IEEE Standard 1394 nodes. More particularly, the invention is a method and apparatus for presenting a plurality of link devices as separate nodes within a singe serial bus module by generating individual or a distinct configuration ROM image for each link device in the module.

2. The Prior Art

The Institute of Electrical and Electronics Engineers, Inc. (IEEE) defines the IEEE Standard 1394-1995 serial bus architecture in the document "IEEE Standard for a High Performance Serial Bus" published Aug. 30, 1996 that is incorporated herein by reference. In IEEE 1394, the serial bus architecture is defined in terms of nodes. In general, a node is an addressable entity (i.e., a logical entity with a unique address), which can be independently reset and identified. More than one node may reside on a single module, and more than one unit may reside in a single node.

A module is a physical device, comprising one or more nodes that share a physical interface. The address space provided by a node can be directly mapped to one or more units. A unit is a logical entity, such as a disk controller, which corresponds to unique I/O (input/output) driver software. On a multifunction node, for example, a processor and I/O interfaces could be different units on the same node.

Modules and/or nodes can be "interconnected" with each other using an appropriate physical topology suitable for use with the serial bus, such as a "backplane environment" and/or "cable environment", for example. These environments are described in further detail in Institute of Electrical and Electronics Engineers (IEEE) Standard 1394-1995 "IEEE Standard for a High Performance Serial Bus" published Aug. 30, 1996. Interconnected nodes may reside in either environment without restriction.

Configuration ROM implementations are well known in the field of serial bus devices and provide the hardware and software specifications of a serial bus node and its associated units. For example in IEEE Standard 1394, two configuration ROM formats are supported: minimal and general. The minimal ROM format provides a 24-bit company identifier. The general ROM format provides additional information in a bus_info_block and a root_directory. Entries within the root_directory may provide information or may provide a pointer to another directory (root-dependent directory and/or unit_directory), which has the same structure as the root_directory. Entries within the root directory may also provide a pointer to a leaf, which contains information. The unit_directories contain information about the units associated with the node, such as their software version number and their location within the address space of the node, for example.

FIG. 1 shows a general ROM implementation format for IEEE Standard 1394. The ROM directory structure is a hierarchy of information blocks, where the blocks higher in the hierarchy point to the blocks beneath them. The location of the initial blocks (info_length, crc_length, rom_crc_value, bus_info_block, and root_directory) are fixed. The location of the other entries (unit_directories, root and unit leaves) varies according to each vendor, but are specified by entries within the root_directory or its associated directories.

In general, the bus_info_block provides specific information about the node. For example, the bus_info_block may indicate whether the node carries out isochronous data transfers. Additionally, the bus_info_block provides a node_vendor_id field, a chip_id_hi field, and a chip_id_lo field, among other things. Together, the node_vendor_id, chip_id_hi, and chip_id_lo fields form a 64-bit node unique identifier. Other node specific information may be provided in the root_directory and the root leaves of the ROM. Unit specific information is normally provided in the unit_directory and the unit leaves of the ROM. For example, the specification identification and the version number may be provided for a particular protocol in the unit_directory and the unit leaves. IEEE Standard 1394-1995 "IEEE Standard for a High Performance Serial Bus" published Aug. 30, 1996 describes the general ROM format and its associated blocks in further detail and is incorporated herein by reference.

According to the prior art, a serial bus module may include one or more nodes. For example, FIG. 2 illustrates a typical module device 1 having first and second nodes 2a, 2b. Nodes 2a, 2b include respective link layer services (LINK) 3a, 3b and physical layer services (PHY) 4a, 4b. Each link device 3a, 3b includes a respective global unique identifier (GUID) 5a, 5b identify each node device 2a, 2b.

Presently, the configuration ROM described above is managed by software operating at the transaction layer 6 in module 1. However, current transaction layer implementations which support multiple link devices (such as depicted in FIG. 2) present a single configuration ROM image 7 for both link devices. As a result, transaction layer software 6 presents nodes 2a and 2b as the same GUID, which may result in inconsistent information provided to the serial bus 8.

Other node or module devices (not shown) attached to serial bus 8 may query module 1 to ascertain certain configuration data associated with module 1. For example, a remote node may query module 1 to ascertain, among other things, the node configuration of module 1 and/or the units presented by the nodes of module 1. These remote nodes query module 1 using one of various request commands. Some remote nodes request information "by quadlet" and other nodes request information "by block", for example.

When a request is made by quadlet, the corresponding link devices 3a, 3b provide the requested data from the hardware registers 9a, 9b associated with the respective link device 3a, 3b. In this manner, link device 3a provides the requested data from its hardware registers 9a, and link device 3b provides the requested data from its hardware registers 9b.

However, when a request is made by block, the requested data is provided from the configuration ROM 7 which is normally managed by the transaction layer software 6. As noted above, present transaction layer implementations provide a single configuration ROM 7 for multiple link devices 3a, 3b. Thus the data provided in conjunction with a request by block may be different and inconsistent with that provided had the request been made by quadlet.

Accordingly, there is a need for a method for presenting a plurality of link devices as separate nodes within a single serial bus module by generating an individual or distinct configuration ROM image for each link device in the module so that when a request is made to the module, accurate and consistent data is provided to the requesting device. The present invention satisfies these needs, as well as others, and generally overcomes the deficiencies found in the background art.

BRIEF DESCRIPTION OF THE INVENTION

An object of the invention is to provide a method for supporting multiple link devices in a single module that overcomes the deficiencies of the prior art.

Another object of the invention is to provide a method for presenting a plurality of link devices as separate nodes within a single serial bus by providing an individual configuration ROM for each link device in the module.

Further objects and advantages of the invention will be brought out in the following portions of the specification, wherein the detailed description is for the purpose of fully disclosing the preferred embodiment of the invention without placing limitations thereon.

The present invention is a method and apparatus embodied in transaction layer software suitable for use with serial bus devices, such as IEEE standard 1394 serial bus devices. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

In its most general terms, the invention comprises software for supporting multiple link devices in the same physical module as separate nodes by presenting individual or distinct configuration ROMs for each link device to the serial bus. In the preferred embodiment, the software comprises IEEE standard 1394 transaction layer software (TNF kernel) for a serial bus module attachable to an IEEE standard 1394 bus. The software is executed by a conventional processor within the module device as is known in the art.

The serial bus module may include one or more link devices operatively coupled for communication with the TNF kernel. In other exemplary embodiments, device driver services may be used to manage communication between the TNF kernel and the link devices as is known in the art.

The TNF kernel carries out the operation of ascertaining or becoming aware of the link devices in the modules, creating an individual configuration ROM for each link device, and presenting the created configuration ROMs to the other devices on the 1394 bus to thereby present each link device in the module as a separate node.

The TNF kernel ascertains each link device normally during initialization of the module, either through a predefined startup routine or through notification from device driver services, if such services are implemented in the module. The TNF kernel ascertains, among other things, each link device's GUID (globally unique identifier).

For each link device, the TNF kernel creates a data structure suitable for storing data associated with each link device. In an exemplary embodiment of the invention, the TNF kernel uses a data structure comprising a list of link data records, one record for each link device. Each link data record includes a CSR (control and status register) address map and Configuration ROM image storage and/or support thereof. Each Configuration ROM image is constructed using, among other things, the information for each link device and includes an entry for the link device GUID. The CSR address map is a data structure that, among other things, points to the active configuration ROM. In one of a number of possible embodiments, the present invention may employ dynamic configuration ROM using double image buffers which is described in copending application Ser. No. 09/431,703 having the title "A SYSTEM AND METHOD FOR PROVIDING DYNAMIC CONFIGURATION ROM USING DOUBLE IMAGE BUFFERS" filed on Nov. 1, 1999 and is incorporated herein by reference.

Requests by other devices to the module are communicated from the serial bus to the physical layer device in the present module. Communications for layers higher than the physical layer are then communicated to the link layer device for further processing.

When a request by quadlet is made to the module, the appropriate link device provides the appropriate information from the link device's registers as is conventionally carried out.

However, when a request by block is made to the module, the request is communicated from the corresponding link device to the TNF kernel. In addition, the link device provides its unique software ID (Link ID) along with the request. In response to the block request, the TNF kernel provides the configuration ROM for the appropriate link device according to the Link ID. Since individual configuration ROMs are created for each link device in the module, the information provided by the TNF kernel via the individual configuration ROM is consistent with information provided in response to requests made by quadlet as described above.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 3:
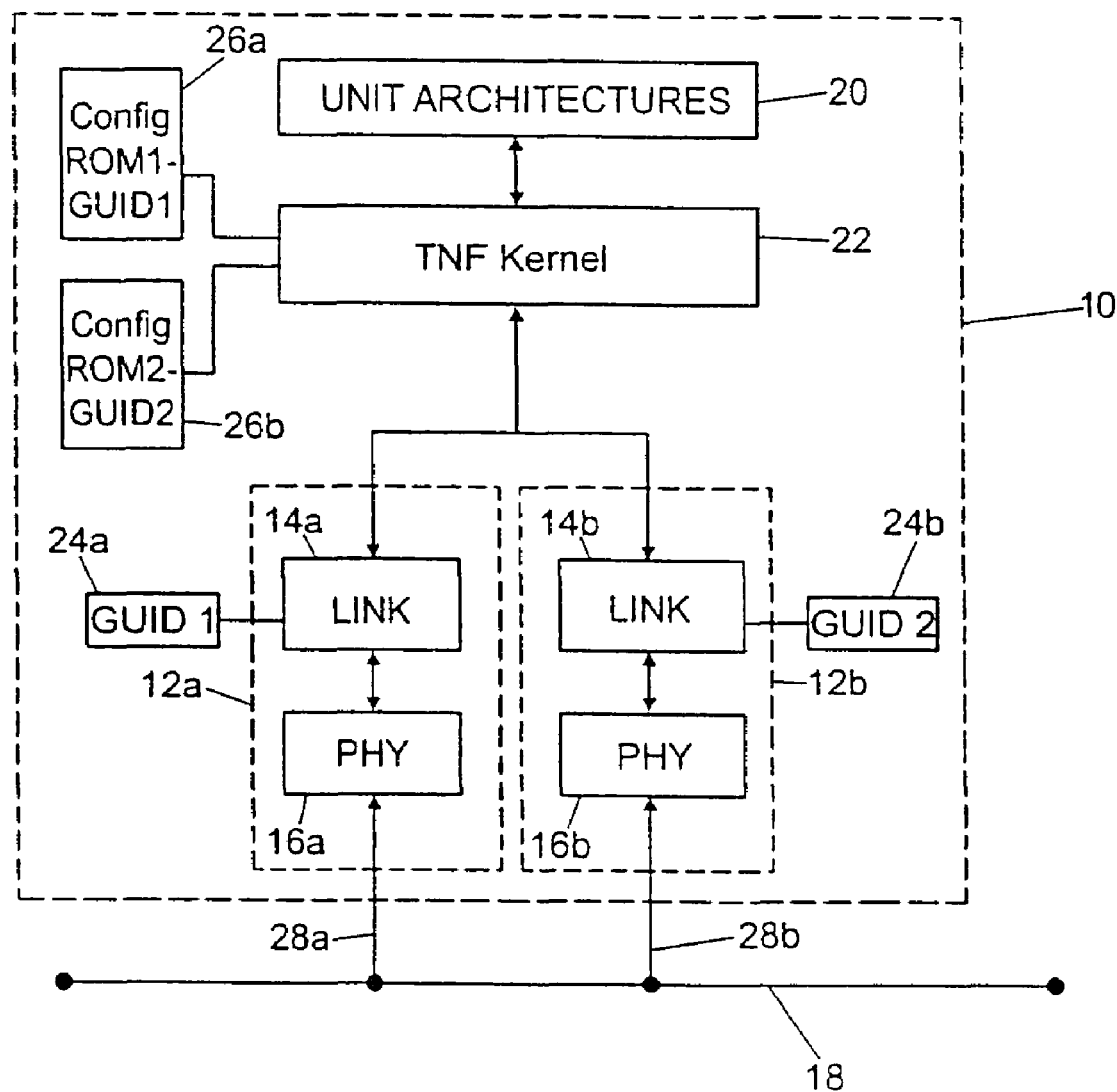
FIG. 3 is a functional block diagram of an illustrative embodiment serial device module which carries out multiple link device presentation according to the present invention.
Figure 4:
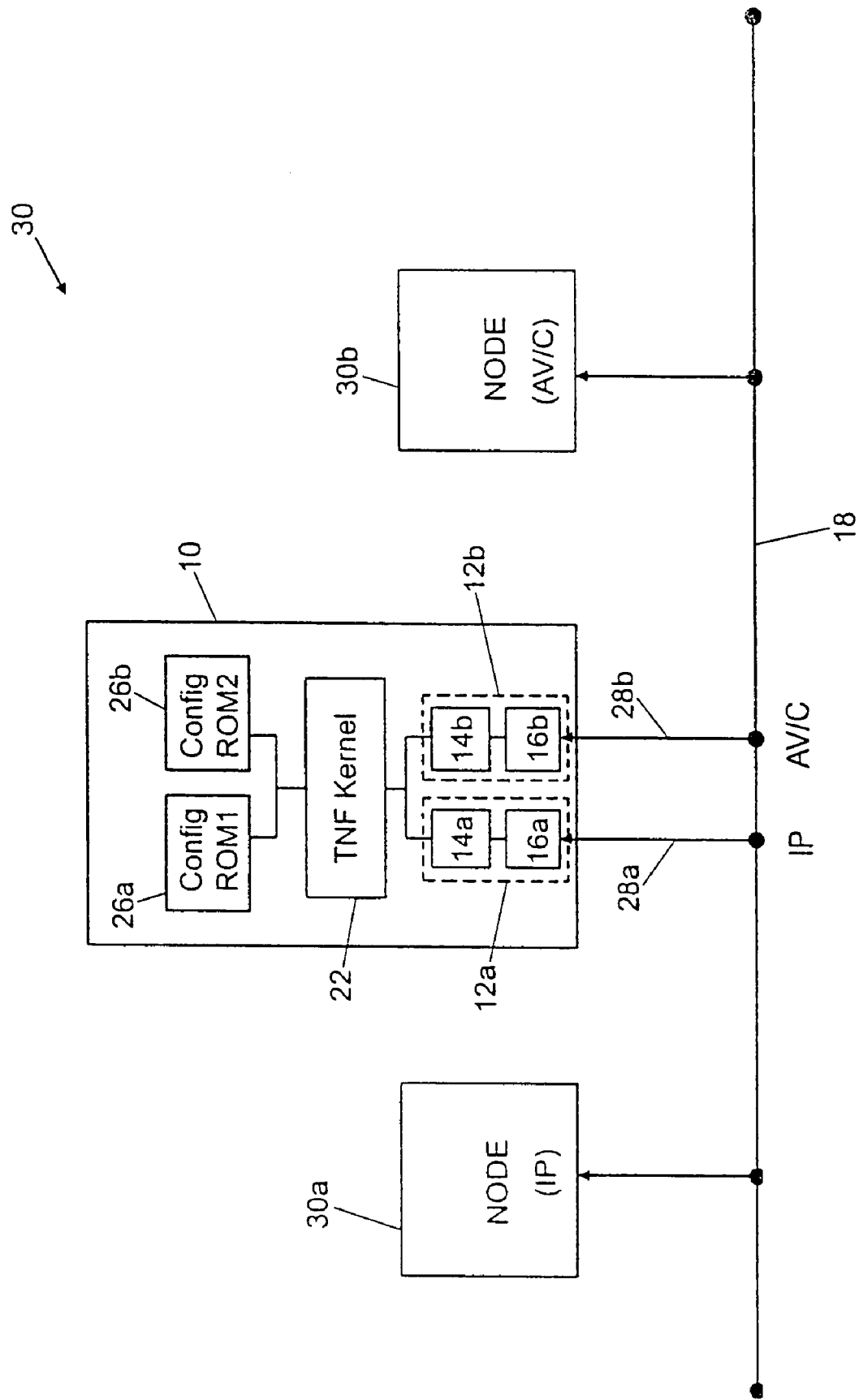
FIG. 4 is a functional block diagram of an illustrative communication system which includes a serial device module configured to carry out multiple link device presentation according to the present invention.
Figure 5:
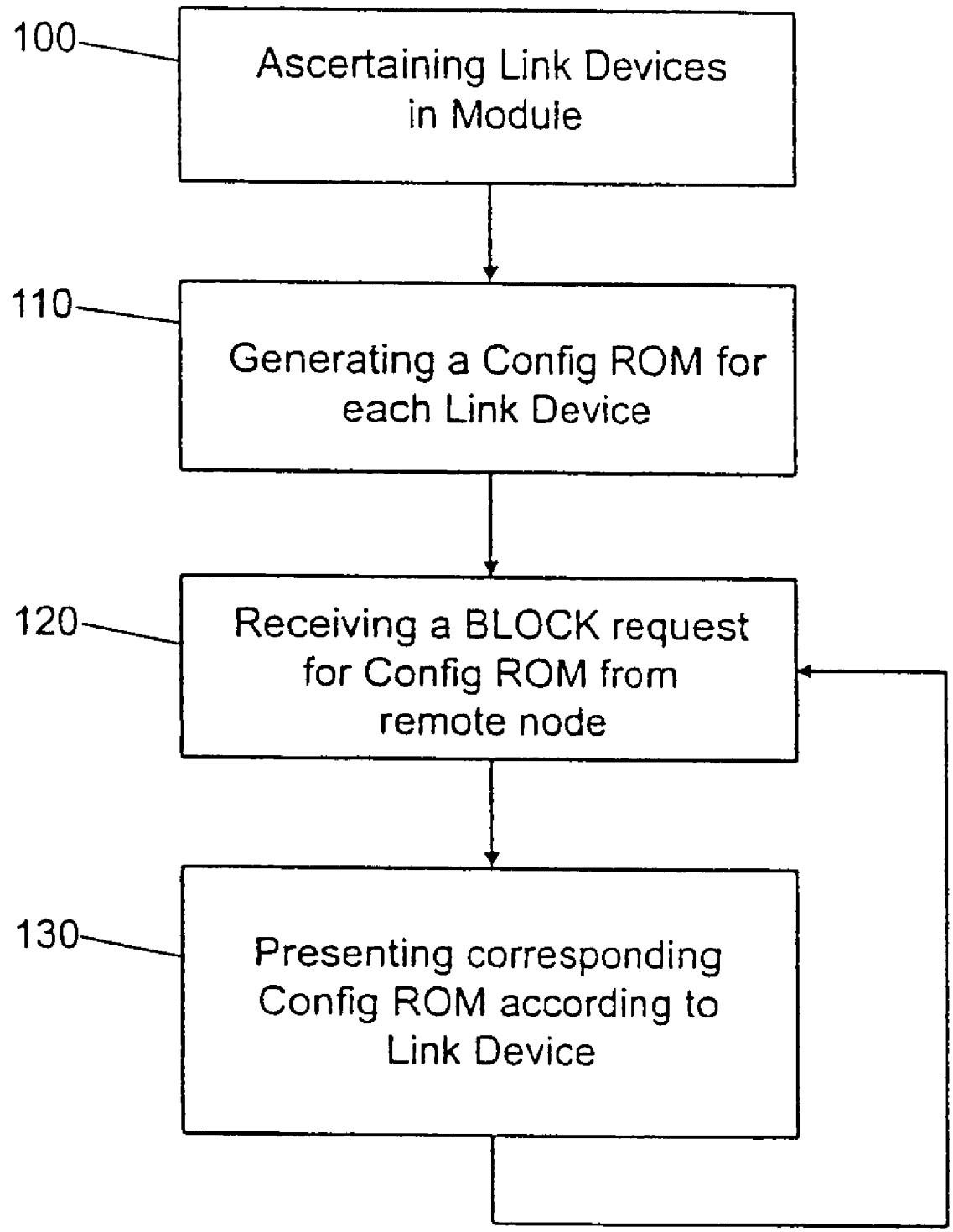
FIG. 5 is a flow chart showing generally acts for supporting and presenting a plurality of separate nodes as separate nodes according to the present invention.

Referring more specifically to the drawings, for illustrative purposes the present invention is embodied in the apparatus shown FIG. 3 and FIG. 4 and the method outlined in FIG. 5.

It will be appreciated that the apparatus may vary as to configuration and as to details of the parts, and that the method may vary as to details and the order of the acts, without departing from the basic concepts as disclosed herein. The invention is disclosed generally in terms of a method and apparatus for use with IEEE standard 1394 devices, although numerous other uses for the invention will suggest themselves to persons of ordinary skill in the art.

Referring now to FIG. 3, there is shown a functional block diagram of an illustrative embodiment of serial device module 10 that carries out multiple link device support and presentation according to the present invention. Module 10 includes two nodes 12a, 12b, each having a respective link layer (LINK) device 14a, 14b connected to a respective physical layer (PHY) device 16a, 16b. LINKS 14a, 14b provide the link services for the module 26 as is known in the art, and PHY devices 16a, 16b provide the physical layer services for the module 10 as is known in the art. Each PHY device 16a, 16b is connected to serial bus 18 through a conventional serial interface connection, such as cables, connectors and physical silicon, for example.

Figure 1:
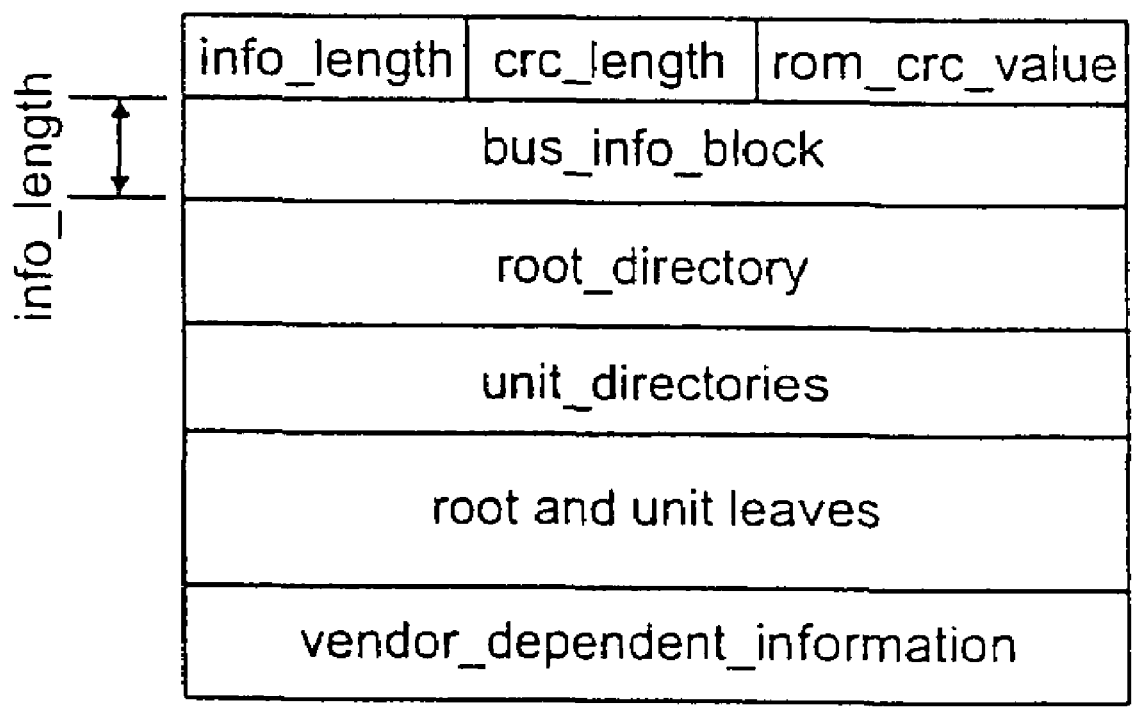
FIG. 1 is a block diagram showing a general configuration ROM format according to the IEEE Standard 1394.
Figure 2:
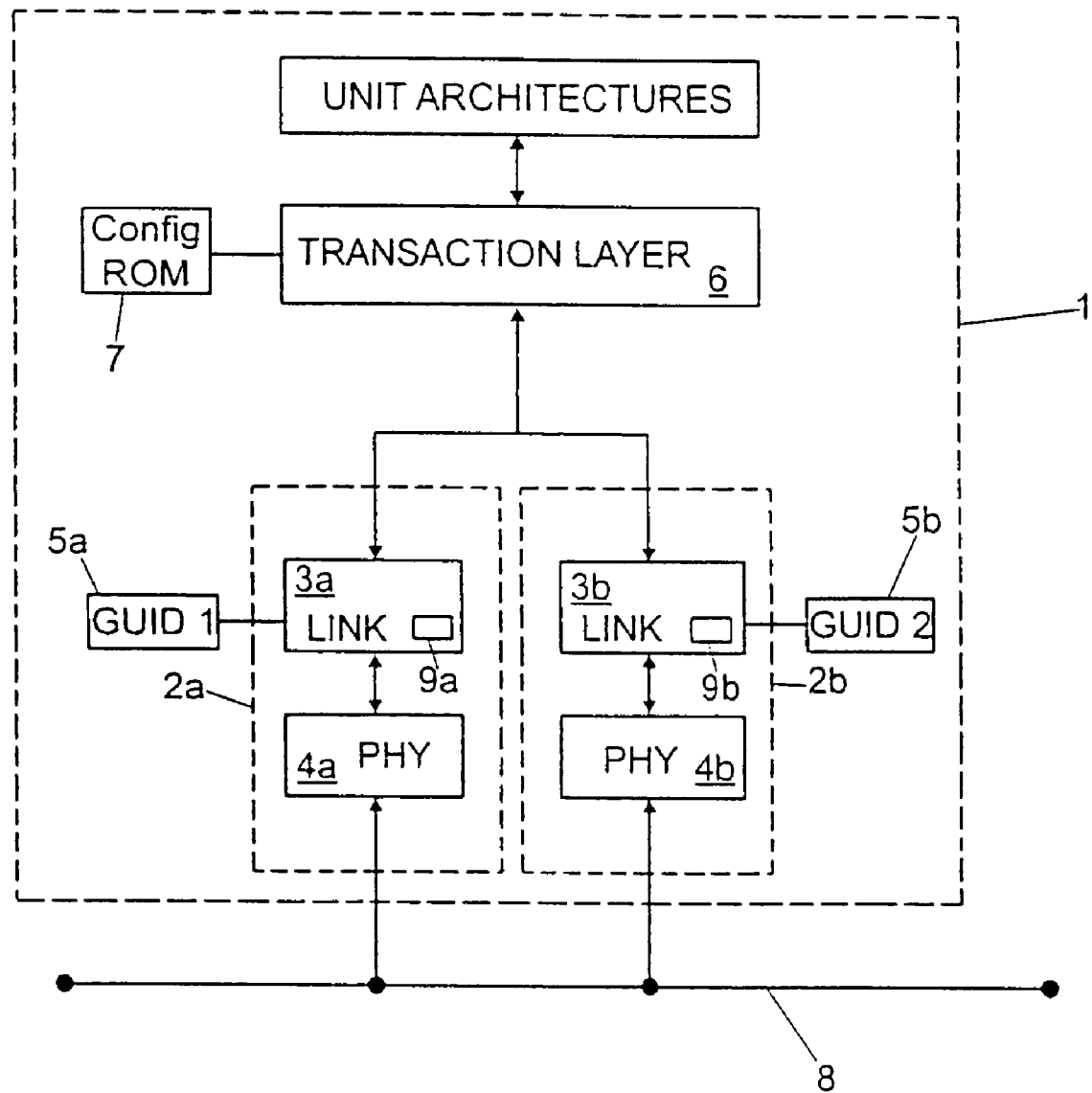
FIG. 2 is a functional block diagram of serial device module which carries out multiple link device presentation according to the prior art.

The module 10 further includes one or more unit architectures 20 to present to other devices on the serial bus 18. Unit architectures 20 may comprise conventional units, such as a disk controller or some other storage device and a scanner controller, for example. These unit architectures 20 are presented to the serial bus by the generated configuration ROM as described further below and described above in conjunction with FIG. 1.

The unit architectures 20 and the LINKS 14a, 14b are operatively coupled for communication to TNF kernel 22. The TNF kernel 22 provides transactional services for module 10 and the method of the invention as described herein and in further detail in conjunction with FIG. 5. It will be appreciated that module 10 is only exemplary, and other arrangements of may be utilized without departing from the spirit and scope of the present invention. For example, the invention may be used when one or more link devices are present. Module 10 is depicted with two link devices for illustrative purposes only. Additionally, as noted above, a device driver service may be used to facilitate communication between the TNF kernel 22 and the LINKS 14a, 14b without departing from the scope of the invention.

Each of the LINKs 14a, 14b further includes a respective global unique identifier (GUID) 24a, 24b that identifies each node 12a, 12b to other nodes on the serial bus.

The TNF kernel 22 becomes aware of each link device normally during initialization of the module 10, either through a predefined startup routine or through notification from device driver services, if such services are implemented in the module. The TNF kernel 22 ascertains, among other things, each link device's GUID 24a, 24b.

The TNF kernel 22 then creates, normally within RAM (not shown), a data structure for storing configuration ROM data for each link device 14a, 14b. Various data structures may be used for storing configuration ROM data, however, in the preferred embodiment, the TNF kernel 22 uses a linked list of "link data records", one data record for each link device 14a, 14b. Thus, TNF kernel 22 creates a configuration ROM 26a, 26b corresponding to each link device 14a, 14b. For each configuration ROM 26a, 26b, the TNF kernel 22 creates a GUID entry for the corresponding link device 14a, 14b. Thus, ROM 22a which is associated with link 14a includes an entry for GUID1 24a, and ROM 22b which is associated with link 14b includes an entry for GUID1 24b. With this arrangement, a one-to-one mapping is made with LINK 14a to node 12a via configuration ROM 26a, and with LINK 14b to node 12b via configuration ROM 26b.

The CSR address map of node 10 includes pointers to various items associated with node 10, including the ROM associated with each link device 14a, 14b.

As noted above, the present invention may be used in conjunction with the dynamic configuration ROM implementation described in copending application Ser. No. 09/431,703 having the title "A SYSTEM AND METHOD FOR PROVIDING DYNAMIC CONFIGURATION ROM USING DOUBLE IMAGE BUFFERS" filed on Nov. 1, 1999 and is incorporated herein by reference. This embodiment is one of a number of possible embodiments.

Referring now to FIG. 4, as well as FIG. 3, there is generally shown a functional block diagram of an illustrative communication system 30 which includes a serial device module configured to carry out multiple link device support and presentation according to the present invention.

System 30 includes a module 10 structured and configured as described above in conjunction with FIG. 3. Module 10 includes nodes 12a, 12b represented by PHY 16a operatively coupled to LINK 14a and PHY 16b operatively coupled to LINK 14b. LINKS 14a, 14b are coupled for communication to TNF kernel 22 (although a device driver service may also be used). As depicted in FIG. 4, TNF kernel 22 has created configuration ROM 26a associated with link 14a and ROM 26b associated with link 14b as described above.

Module 10 is connected to the serial bus 18 via lines 28a and 28b, where line 28a is coupled to PHY 16a (Node 12a) and line 28b is coupled to PHY 16b (Node 12b). As depicted in FIG. 4, Node 12a is configured for 1394 IP (Internet Protocol) communication, while Node 12b is configured for 1394 AV/C (Audio/Video Control) communication. Thus, IP requests to Module 10 are communicated through line 28a, then through PHY 16a, then through LINK 14a to TNF kernel 22. AV/C requests to Module 10 are communicated through line 28b, then through PHY 16b, then through LINK 14b to TNF kernel 22. When such requests are routed from the LINKS 14a, 14b to TNF kernel 22, the LINK devices also communicate a unique software ID (Link ID) to thereby indicated which link device is passing the request.

Module 10 further includes Nodes 30a, 30b each operatively coupled to the serial bus 18. Nodes 30a, 30b may comprise any serial bus device capable of communication with Module 10. Other modules having a plurality of nodes (not shown) may also be connected to the serial bus 18 and communicate with Module 10 in substantially the same manner as described herein with respect to nodes 30a, 30b. As shown, node 30a is structured and configured for 1394 IP communication, while node 30b is structured and configured for 1394 AV/C communication.

In operation, when node 30a makes a block read request (1394 IP) to module 10, such request is communicated along bus 18 and line 28a to PHY 16a. PHY 16a then communicates the request to LINK 14a, for further processing. LINK 14a then communicates the request to TNF kernel 22, along with Link ID of LINK 14a. In response, TNF kernel 22 provides the configuration ROM information associated with LINK 14a from ROM 26a. As noted above, ROM 26a includes the GUID associated with LINK 14a. This configuration ROM information is then communicated back to Node 30a via LINK 14a, then through PHY 16a, line 28a, and bus 18 ultimately to the requesting node 30a.

In contrast to the previous data path outlined above for node 30a, when node 30b makes a block read request (1394 AV/C) to module 10, such request is communicated along bus 18 and line 28b to PHY 16b. PHY 16b then communicates the request to LINK 14b, for further processing. LINK 14b then communicates the request to TNF kernel 22, along with Link ID of LINK 14b. In response, TNF kernel 22 provides the configuration ROM information associated with LINK 14b from ROM 26b, which includes the GUID associated with LINK 14b. This configuration ROM information is then communicated back to Node 30b via LINK 14b, then through PHY 16b, line 28b, and bus 18 ultimately to the requesting node 30b.

As illustrated above, TNF kernel 22 provides the corresponding configuration ROM (including correct GUID data) for the link device in which the request is carried out and in which communication is carried through. As such, a consistent one-to-one mapping between link devices and nodes is provided within the multiple-link device module (in the above example module 10) even when the request is a request "by block".

The method and operation of the invention will be more fully understood by reference to the flow chart of FIG. 5, as well as FIG. 3 and FIG. 4. FIG. 5 illustrates generally the actions associated with supporting and presenting a plurality of separate nodes as separate nodes according to the present invention. The order of operation as shown in FIG. 4 and described below is only exemplary, and should not be considered limiting.

At box 100, the TNF kernel 22 operating in module 10 becomes aware of the link devices in the module. As noted above, this is carried out normally during initialization of the module 10, either through a predefined startup routine or through notification from device driver. The TNF kernel 22 ascertains, among other things, each link device's GUID 24a, 24b. Box 110 is then carried out.

At box 110, the TNF kernel 22 creates or otherwise generates a configuration ROM image for each link device within the module 10. Thus, in FIG. 3 and FIG. 4, the TNF kernel 22 creates configuration ROM 26a for link 14a and ROM 26b for link 14b. Each configuration ROM 26a, 26b will include such ROM information related to the respective LINK 14a, 14b including an entry for the respective GUID 24a, 24b. The format of the configuration ROM 26a, 26b complies to the standard set forth for the device which in the present example is IEEE standard 1394 as described above in conjunction with FIG. 1. Box 120 is then carried out.

At box 120, the module 10 receives a block request from another node (or module) on the serial bus. The request is received in respective PHY 16a, 16b. Which PHY receives the request varies according to various factors, including which protocol is supported, for example as illustrated in FIG. 4. The PHY then communicates the request to the LINK. The LINK in turn communicates the request to the TNF kernel 22 along with the LINK ID. As noted above, the LINK ID is used by the TNF kernel 22 to ascertain which configuration ROM 26a, 26b to provide to the requesting node. BOX 130 is then carried out.

At box 130, the TNF kernel 22 determines which configuration ROM 26a, 26b is requested according the LINK ID communicated from the LINK device from box 120. The TNF kernel 22 then provides the configuration ROM associated with the LINK ID to the requesting node. If the module uses the dynamic configuration ROM using double image buffers, noted above, then the TNF kernel provides the "active" ROM image according the LINK ID provided. Step 120 may then be carried out again for additional block requests.

Accordingly, it will be seen that this invention provides a method which supporting multiple link devices in the same physical module as separate nodes by presenting individual or distinct configuration ROMs for each link device to the serial bus. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A computer-readable apparatus, comprising:
   a storage medium; and
   a computer program, stored on said storage medium, comprising instructions which, when executed by a computer, create a separate configuration image for each node of a first plurality of nodes;
   wherein all nodes of said first plurality are associated with a first device.

2. The computer-readable apparatus of claim 1, wherein the computer program further comprises instructions which, when executed by said computer, uniquely identify each node in the first plurality.

3. The computer-readable apparatus of claim 1, wherein each said configuration image comprises node data, said node data associated with a node in the first plurality.

4. The computer-readable apparatus of claim 3, wherein the computer program further comprises instructions which, when executed by said computer, presents node data upon receiving request data.

5. The computer-readable apparatus of claim 4, wherein said request data comprises a block request and a link ID, said link ID being uniquely associated with a node of the first plurality.

6. The computer-readable apparatus of claim 5, wherein the computer program further comprises instructions which, when executed by said computer, locate a configuration image based at least in part on said link ID.

7. The computer-readable apparatus of claim 1, wherein said instructions comprise transaction layer software for use with a high-speed serial bus.

8. The computer-readable apparatus of claim 1, wherein each configuration image comprises an identifier, said identifier uniquely referencing a node in the first plurality of nodes.

9. Network apparatus comprising:
   a processor; and
   logic operative with said processor to create a configuration image for each of a plurality of link devices, each of said link devices residing within a first network module.

10. The apparatus of claim 9, wherein each said configuration image comprises an identifier that uniquely corresponds to a link device of said plurality.

11. The apparatus of claim 10, further comprising logic adapted to identify each link device from said plurality.

12. The apparatus of claim 10, further comprising logic adapted to present a configuration image to a requesting entity.

13. The apparatus of claim 12, wherein the logic adapted to present a configuration image to a requesting entity comprises logic adapted to receive request data.

14. The apparatus of claim 13, wherein said request data comprises a block request and a link ID.

15. The apparatus of claim 14, wherein the logic adapted to present a configuration image to a requesting entity further comprises logic adapted to identify a configuration image based at least in part on the identifier and the link ID.

16. The apparatus of claim 12, wherein the logic adapted to present a configuration image to a requesting entity further comprises logic adapted to return at least a portion of the requested configuration image to the requesting entity.

17. The apparatus of claim 12, wherein both the logic adapted to create a configuration image and the logic adapted to presenting a configuration image operate at the transaction layer of a serial bus protocol.

18. The apparatus of claim 9, wherein said module further comprises transaction layer software.

19. The apparatus of claim 18, wherein said transaction layer software is adapted to support a high-speed serialized bus protocol.

20. The apparatus of claim 18, wherein said apparatus further comprises first and second configuration storage devices in communication with said transaction layer software.

21. The apparatus of claim 20, wherein said first and second configuration storage devices comprise first and second read-only memories (ROMs), and said first and second memories comprises data that is at least partly unique to first and second ones of said plurality of link devices, respectively.

22. A method of operating a serial bus module comprising a plurality of link devices, the method comprising:
identifying each of said plurality of link devices resident in said serial bus module; and
for each said link device, creating a unique configuration image.

23. The method of claim 22, wherein creating a configuration image comprises creating a read-only memory (ROM) image.

24. The method of claim 22, wherein creating a configuration image comprises creating a first identifier adapted to uniquely reference a link device.

25. The method of claim 24, further comprising presenting a configuration image to a first device.

26. The method of claim 25, wherein presenting a configuration image comprises receiving data from the first device.

27. The method of claim 26, wherein the data comprises a request and a second identifier.

28. The method of claim 27, wherein said presenting a configuration image further comprises presenting at least a portion of the configuration image based at least in part on the first identifier and the second identifier.

29. The method of claim 25, wherein said presenting a configuration image is performed at least in part by transaction layer software.

30. The method of claim 22, wherein said creating a configuration image is performed at least in part by transaction layer software.

31. Network apparatus, comprising:
a first device comprising a first module to create an image for each of a plurality of link devices;
wherein each link device of said plurality resides in a second device.

32. The apparatus of claim 31, wherein each said image comprises an identifier to uniquely reference a corresponding one of said link devices.

33. The apparatus of claim 32, wherein said first device further comprises a second module, to identify at least one link device of said plurality.

34. The apparatus of claim 33, wherein said first device further comprises a third module to present data derived from a configuration image upon receiving a request.

35. The apparatus of claim 34, wherein the third module further performance function of receiving the request from at least one of said plurality of link devices.

36. The apparatus of claim 35, wherein the request comprises a block request and a link ID.

37. The apparatus of claim 35, wherein the third module further performs function of presenting said data derived from said configuration image based at least in part upon the identifier and the link ID.

38. The apparatus of claim 37, wherein both the first module and the second module operate at the transaction layer of a serial bus protocol.

39. An apparatus comprising:
a plurality of link layer apparatus; and
for each link layer apparatus in said plurality, a distinct configuration image.

40. The apparatus of claim 39, wherein each said configuration image comprises a read-only memory (ROM) image disposed within a separate ROM storage area.

41. The apparatus of claim 40, further comprising software to respond to requests for data stored in at least one configuration image.

42. The apparatus of claim 41, wherein said software operates at least at the transaction layer of a high speed serial bus protocol.

43. The apparatus of claim 42, wherein the protocol comprises an IEEE-1394 compliant serial bus protocol.

44. The apparatus of claim 42, wherein said software further presents a configuration image to a requesting device upon receiving a request from the requesting device.

45. The apparatus of claim 44, wherein the request comprises a first segment and a second segment.

46. The apparatus of claim 39, wherein each said configuration image comprises a globally unique identifier, and wherein each globally unique identifier uniquely references a link layer apparatus of said plurality.

47. The apparatus of claim 39, wherein the apparatus operates on an IEEE-1394 compliant serial bus.

48. A communication system, comprising:
a plurality of serial bus devices each comprising at least one link layer module; and
a serial bus in data communication with each of said serial bus devices;
wherein at least one of said serial bus devices comprises:
a plurality of link layer modules; and
a configuration image for each of said plurality of link layer modules, each of said images being at least partly different than the others of said images.

49. The communication system of claim 48, wherein said at least one serial bus devices comprising a plurality of link layer modules further comprises software, said software adapted to return data derived from a configuration image to a requesting device.

50. The communication system of claim 49, wherein each configuration image comprises a globally unique identifier, the globally unique identifier adapted to reference a corresponding link layer module.

51. The communication system of claim 50, wherein each link layer module provides link layer services to the serial bus device that the link layer module is associated with.

52. Network apparatus, comprising:
a computerized host;
a transaction layer process operative to run on said host; and
one or more link devices operatively coupled to permit communication with the transaction layer process;
wherein the transaction layer process functions to:
discover the one or more link devices;
create an individual configuration image for each link device; and
present the created configuration images to at least one other devices on a bus in data communication with said network apparatus, and thereby present each link device in the network apparatus as a separate node.

53. The network apparatus of claim 52, wherein said process discovers each link device during initialization of the network apparatus.

54. The network apparatus of claim 53, wherein said discovery is accomplished using at least a predefined startup routine.

55. The network apparatus of claim 53, wherein said discovery is accomplished using at least a notification from a device driver service.

56. The network apparatus of claim 52, wherein said process further to discover discovers globally unique identifier for each said one or more link devices.

57. A communication system, comprising:
   a plurality of high speed serial bus devices each comprising at least one link layer module; and
   at least one serial bus in data communication with each of said serial bus devices;
   wherein at least one of said serial bus devices comprises:
      a plurality of link layer modules comprising at least one computer program; and
      a configuration image for each of said plurality of link layer modules, each of said images being at least partly different than others of said images.

58. A method of operating a serial bus module, comprising:
   identifying each link device resident in said serial bus module;
   for each said link device, creating a unique configuration image comprising a first identifier adapted to uniquely reference a link device;
   receiving a request and a second identifier from a first device; and
   presenting at least a portion of the configuration image to said first device based at least in part on the first and second identifiers.

59. The method of claim 58, wherein said creating a configuration image comprises creating a read-only memory (ROM) image.

60. The method of claim 58, wherein said serial bus module is compliant with an IEEE-1394 Standard.

61. The method of claim 58, wherein said creating a unique configuration image is performed at least in part by transaction layer software.

62. A method of operating a system comprising a high-speed serial bus, the method comprising:
   identifying a plurality of link devices resident in said system;
   for each said link device, creating a unique configuration image comprising a first identifier adapted to uniquely reference a link device;
   receiving a request and a second identifier from a first device of said system; and
   presenting at least a portion of the configuration image to said first device based at least in part on the first and second identifiers.

63. The method of claim 62, wherein said creating a configuration image comprises creating a read-only memory (ROM) image.

64. The method of claim 62, wherein said serial bus is compliant with an IEEE-1394 Standard.

65. The method of claim 62, wherein said creating a unique configuration image is performed at least in part by transaction layer software.

* * * * *